Aug. 1, 1950          J. G. OETZEL          2,516,904

CONTROL FOR VEHICLE BRAKING SYSTEMS

Original Filed May 2, 1942

INVENTOR
John George Oetzel

BY Carlson, Pigney, Hatton & Wolfe

ATTORNEYS

Patented Aug. 1, 1950

2,516,904

UNITED STATES PATENT OFFICE 2,516,904

CONTROL FOR VEHICLE BRAKING SYSTEMS

John George Oetzel, Beloit, Wis., assignor to Warner Electric Brake Manufacturing Company, South Beloit, Ill., a corporation of Illinois Original application May 2, 1942, Serial No. 441,486. Divided and this application January 25, 1946, Serial No. 643,322

3 Claims. (Cl. 192—3)

This invention relates to a control governing the automatic energization of electrodynamic brakes on an automotive vehicle.

One object is to provide a control for an electrodynamic brake including a vehicle-driven generator and means for maintaining the generator disabled effectually at times when the brakes are to be deenergized.

Another object is to provide an electrodynamic brake energized by a vehicle-driven generator under the control of the manually operable speed controller of the vehicle.

A further object is to provide a novel means for maintaining the electrodynamic braking means ineffectual below predetermined vehicle speeds.

Figure 1:
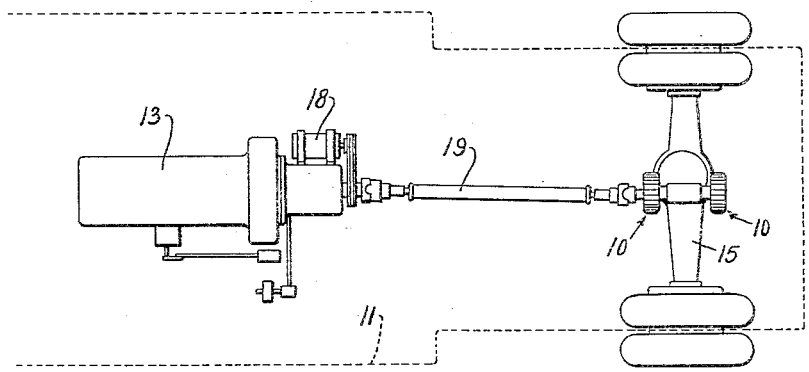

Other objects and advantages of the invention will become apparent from the following detailed description taken in connection with the accompanying drawings, in which Figure 1 is a plan view of the wheel and axle assemblies and the power plant of a truck equipped with a braking system embodying the present invention, the truck body being shown in phantom.

Figure 2:
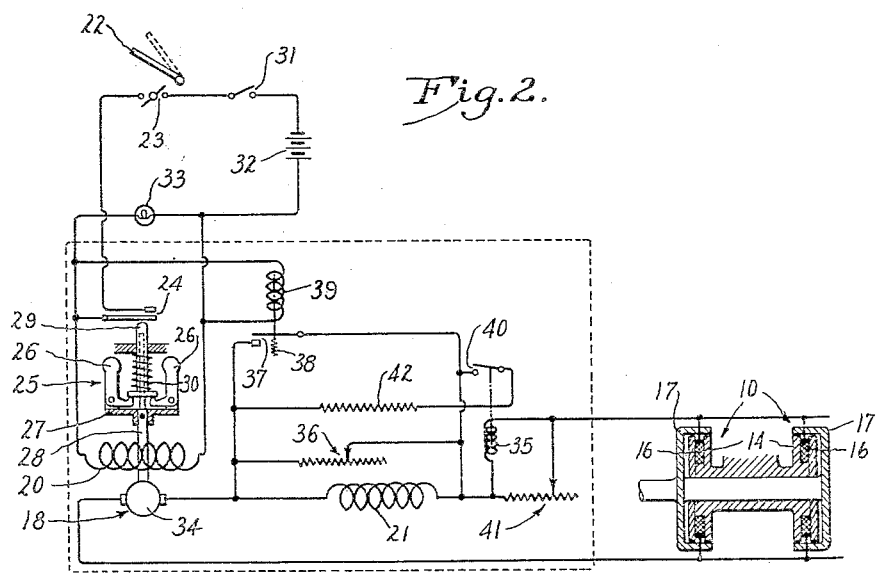

Fig. 2 is a schematic view and wiring diagram of the automatic control.

For purposes of illustration, the invention has been shown as applied to the control of auxiliary brakes 10 of the eddy current type applied to the axles of a truck or tractor 11 driven by an internal combustion engine 13. The brakes are of the well-known eddy current type comprising a non-rotatable toothed magnet core 14 adapted to be fixed to the axle housing 15 of the vehicle and having a winding 16 and arranged with the magnet poles coacting with a flange or drum 17, preferably composed of cast iron and driven in unison with the vehicle axle. When the winding 16 is energized, flux threads the circuit around the winding including the drum or inductor 17 creating eddy currents in the latter. The magnet being stationary, a retarding effect is thus exerted on the drum and therefore on the vehicle axle, the magnitude of this effect being proportional to the vehicle speed and the energizing current.

Current for energizing the eddy current brake windings 16 is preferably derived by an electric generator 18 which may be mounted on the truck and driven as by a belt from the propeller shaft 19. For reasons to appear later, the generator is of the compound type having a shunt winding 20 and a series winding 21, the latter producing a heavily predominant field.

Effective energization of the eddy current brakes from the generator takes place automatically as an incident to normal operation of the vehicle but is dependent on certain conditions one of which includes the release of the accelerator pedal or throttle 22 to full idling position at which a switch 23 is closed. Thus, the eddy current brakes are disabled at all times when the accelerator is depressed to apply power to the vehicle.

To disable the automatic brakes during gear shifting a switch 24 is included in the control circuit. This switch is responsive to the vehicle speed and for this purpose may be actuated by a centrifugal device 25 comprising flyweights 26 on a head 27 which may be driven from the generator shaft 28. When the vehicle speed exceeds a predetermined value, for example, twenty-five miles an hour, below which gear shifting is usually effected, the flyweights move outwardly and shift a sleeve 29 against the action of a spring 30 sufficiently to hold the switch 24 closed. Below this selected speed, the switch is allowed to remain open and the circuit is disabled. Also included in the generator field circuit is the engine ignition switch 31 which operates to prevent draining of the battery 32 when the vehicle is not in use.

In the present instance, the switches 23, 24 and 31 are interposed in series in a circuit including the battery 32 and the shunt winding 20 of the generator. Energization of this winding, as indicated by lighting of a signal lamp 33 on the vehicle dash, occurs when the ignition switch is closed, when the vehicle is traveling above normal gear shifting speeds as evidenced by closure of the switch 24, and when the accelerator is fully retracted, the latter being the natural position of the pedal during coasting of the vehicle.

The windings 16 of all of the eddy current brakes are connected in parallel in a circuit which extends through the generator armature 34, the series field winding 21 and the winding 35 of a relay switch 40. Effective energization of the brake windings 16 and the degree of such energization is controlled by shunts in parallel with the series winding 21 and the relay winding 35. One of these includes a rheostat 36 which is adjustable to vary the degree of energization of the brake windings for a given output current of the generator and therefore the speed of the vehicle. This may, if desired, be located in the truck cab. A second one of the shunts includes a switch 37 normally closed by a spring 38 and opened by energization of a relay winding 39, which winding is in parallel with the shunt generator field 20. Thus, whenever the shunt field 20 is deenergized, the series field 21 is short-circuited through the switch 37 and the generator is disabled against the building up of an output current by residual magnetization of the generator parts.

A third shunt includes a resistance 42 and the switch 40 which is closed when the relay winding 35 is energized to a predetermined degree corresponding to the maximum current which may safely be applied to the brake windings 16. In response to such energization, the switch 40 is closed, the shunt causing a current decrease sufficient to reopen the switch. This process is repeated in rapid succession so that the relay and switch act as a regulator limiting the maximum current applied to the eddy current brakes.

It will be observed that the circuit arrangement above described functions normally to maintain the eddy current brake windings energized continuously whenever the vehicle is coasting at a speed above that for which the centrifugal switch 24 is adapted to respond and become closed. The energization will vary automatically with the vehicle speed producing an electrodynamic retarding effect which increases with the vehicle speed and which may be varied in degree by adjustment of the rheostat 36. As a result, the vehicle speed will be maintained substantially constant on low down grades where all of the required retarding may be supplied by the auxiliary eddy current brakes alone. The speed thus held will be proportional to the grade which the vehicle is descending but will, due to the selected characteristics of the generator, always be near the value selected for safe driving. Except for very gradual grades, the speed thus acquired will usually be between thirty and forty miles per hour. If the established speed is less than that considered safe for driving, the driver may render the eddy current brakes ineffectual simply by depressing the accelerator pedal 22 sufficiently to open the switch 23. When the desired higher speed is attained, the pedal is again released to bring the eddy current brakes into action.

By adjustment of the above described shunt 36 and a shunt 41, it will be apparent that the generator characteristics may be changed as desired. This is advantageous in adapting the eddy current braking to the prevailing vehicle load and the number of vehicles included in the train. The adjustment enables the generator to be conditioned for producing a constant voltage at different amperages.

Now, if the vehicle comes to a long down grade, the driver will, with the present control, release the accelerator and proceed without shifting to a low gear. The shunt field of the generator will be excited immediately. If the vehicle is traveling faster than twenty-five miles per hour, the switch 24 will be closed so that the eddy current brake windings will be energized to a degree corresponding to the prevailing vehicle speed. In case the slope is small, that is, less than six per cent, with brakes of the capacity described above, the vehicle motion will be fully checked by the eddy current effect alone and a speed will be established at which the braking effect plus the engine friction at the prevailing gear ratio balance the gravitational force tending to accelerate the vehicle.

This application is a division of my co-pending application Serial No. 441,486, filed May 2, 1942, now Patent No. 2,395,904.

I claim as my invention:

1. A vehicle braking system having, in combination, an electric generator driven in unison with the vehicle motion and having a shunt winding and a series winding, means operable automatically during coasting of said vehicle above a predetermined speed to energize said shunt winding, electrodynamic braking means variably energized by said generator, a magnetic relay having a winding in parallel with said shunt winding and a switch adapted to be opened when the relay winding is energized to a predetermined degree, and means providing a short circuit around said series winding and having said relay switch interposed therein.

2. In a vehicle braking system having, in combination, an electric generator adapted to be driven in unison with the vehicle motion and having a shunt winding and a series winding, means operable automatically during coasting of said vehicle above a predetermined speed to energize said shunt winding, electrodynamic braking means variably energized by said generator, and means for maintaining a short circuit around said series field when said shunt winding is deenergized.

3. The combination with a vehicle having a manually operable controller movable away from an idling position to increase the vehicle speed, of a generator driven in unison with the vehicle motion, an electrodynamic brake for the vehicle energized by said generator in proportion to the vehicle speed, a speed detector responsive to changes in the speed of said vehicle and operable to detect rises and falls in the speed above and below a predetermined value, and switching mechanism actuated by said vehicle speed controller and by said speed detector and operable to energize said brake from said generator when the vehicle speed increases above a predetermined value with said controller in said idle position and to maintain said brake deenergized either when said controller is out of said idle position or when the vehicle speed is below said predetermined value.

JOHN GEORGE OETZEL.

REFERENCES CITED

The following references are of record in the file of this patent:

UNITED STATES PATENTS

| Number | Name | Date |
|---|---|---|
| 577,119 | Sperry | Feb. 16, 1897 |
| 1,479,463 | Entz | Jan. 1, 1924 |
| 1,677,633 | Harrison | July 17, 1928 |
| 2,035,047 | Cotter | Mar. 24, 1936 |
| 2,107,984 | Harper | Feb. 8, 1938 |
| 2,266,213 | Kattwinkel | Dec. 16, 1941 |